United States Patent [19]
Naville

[11] Patent Number: 6,076,045
[45] Date of Patent: Jun. 13, 2000

[54] METHOD FOR PROCESSING ORIENTED MULTI-COMPONENT SEISMIC WELL DATA

[75] Inventor: Charles Naville, Grigny, France

[73] Assignee: Institut Francais du Petrole, Ruiel-Malmaison, France

[21] Appl. No.: 09/018,960

[22] Filed: Feb. 5, 1998

[30] Foreign Application Priority Data

Feb. 5, 1997 [FR] France .................................. 97 01406

[51] Int. Cl.[7] ..................................................... G01V 1/28
[52] U.S. Cl. ........................................................ 702/10
[58] Field of Search ................................. 367/25, 57, 15, 367/75, 51, 58, 33; 181/108, 106, 102; 166/250.01, 254.2; 702/10, 6

[56] References Cited

U.S. PATENT DOCUMENTS

| | | | |
|---|---|---|---|
| 4,439,732 | 3/1984 | Hesterman et al. | 324/247 |
| 4,486,863 | 12/1984 | French | 367/15 |
| 4,506,352 | 3/1985 | Brandsaeter et al. | 367/21 |
| 4,627,036 | 12/1986 | Wyatt | 367/57 |
| 4,706,224 | 11/1987 | Alford | 367/41 |
| 4,789,969 | 12/1988 | Naville | 367/36 |
| 4,794,573 | 12/1988 | Bell et al. | 367/57 |
| 4,800,981 | 1/1989 | Uttecht et al. | 181/104 |
| 4,894,807 | 1/1990 | Alam et al. | 367/15 |
| 5,029,146 | 7/1991 | Alford | 367/75 |
| 5,079,703 | 1/1992 | Mosher et al. | 364/421 |
| 5,111,437 | 5/1992 | Rice | 367/57 |
| 5,134,369 | 7/1992 | Lo et al. | 324/245 |
| 5,142,500 | 8/1992 | Yamamoto et al. | 367/57 |
| 5,144,590 | 9/1992 | Chon | 367/57 |
| 5,214,613 | 5/1993 | Esmersoy et al. | 367/31 |
| 5,243,562 | 9/1993 | Laurent et al. | 367/25 |
| 5,305,285 | 4/1994 | Naville et al. | 367/49 |
| 5,406,530 | 4/1995 | Yamamoto | 367/57 |
| 5,481,501 | 1/1996 | Blakeslee et al. | 367/57 |
| 5,511,038 | 4/1996 | Angeleri et al. | 367/40 |
| 5,740,125 | 4/1998 | Chon et al. | 367/75 |

FOREIGN PATENT DOCUMENTS

| | | | |
|---|---|---|---|
| 0299862 | 1/1989 | European Pat. Off. | G01V 1/04 |
| 0463604 | 1/1992 | European Pat. Off. | G01V 1/04 |

OTHER PUBLICATIONS

*Geophysics*, vol. 55, No. 1 (Jan. 1990), pp. 39–50, article by C. Esmersoy entitled "Inversion of P and SV Waves from Multicomponent Offset Vertical Seismic Profiles".

*Primary Examiner*—Christine K. Oda
*Assistant Examiner*—Victor J. Taylor
*Attorney, Agent, or Firm*—Antonelli, Terry, Stout & Kraus, LLP

[57] ABSTRACT

A seismic prospecting method allowing positioning in space of geologic events in the neighborhood of a well and calculation of the dip and the direction of dip. Seismic waves are transmitted into the formation, and three-axis seismic sensors placed in the well and coupled with the formation surrounding the well receive seismic data corresponding respectively to components along the three axes of seismic waves reflected by discontinuities in the formation in response to the transmitted seismic waves. Orientation data defining orientation in space of the three-axis seismic sensors is assigned to the seismic data. Processing operators corresponding to the three components are applied in parallel to the seismic data, allowing selection, from polarized waves received at each of multi-axis sensor, of P or S seismic waves useful for characterization of the formation in a neighborhood of the well, locating in space, at each of the multi-axis sensors, respective origin directions of the polarized waves, and positioning in space of the seismic events that generated the polarized waves.

13 Claims, 15 Drawing Sheets

METHOD FOR PROCESSING ORIENTED MULTI-COMPONENT SEISMIC WELL DATA

FIELD OF THE INVENTION

The present invention relates to a method of processing oriented multi-component seismic data obtained in a reception well, particularly seismic data obtained during vertical seismic profiling (VSP) operations using one or more multi-axis sensors coupled with the formations surrounding a well to receive seismic waves, and a seismic source placed at the surface, in the same well as the sensors, or in another well.

The method according to the invention finds applications in VSP type seismic studies of a formation according to several well-known techniques: with simple or multiple perpendicularly offset sources, with displacement of the source along a profile passing through the uphole, referred to as "walkaway", VSP in a deflected hole for example with displacement of the source straight above the receivers in the well, a technique referred to as "walk-above", 3D VSP, on signals recorded by means of sensors in a well sonde or recorded while drilling (VSP-WD), or recorded with permanent seismic sensors as described notably in the inventor's French patents 2,593,292 (U.S. Pat. No. 4,775,089) and 2,656,034 (U.S. Pat. No. 5,181,565).

BACKGROUND OF THE INVENTION

It is common practice, during handling of seismic data obtained by a VSP type method by means of multi-axis receivers for example, to process one of the components, generally the vertical component. Examples of mono-component processing of seismic data are notably described by:

Hardage B.; "Vertical Seismic Profiling", in Geophysical Press Vol.14, 1983, or

Mari J. L. et al.; "Seismic Well Surveying", 1991. Editions Technip, Paris.

It is also well-known to take into account the polarization of direct waves, either for reorientation of the components or for the study of salt diapir neighbourhoods.

However, this conventional limitation to only one of the components leads to a certain uncertainty in the positioning of geologic events, which cannot be removed. Inversion of times only leads to a multiplicity of solutions, since the azimuthal direction of dip of the reflectors is unknown. Furthermore, when two seismic events occur at the same time with close apparent velocities and appear on several consecutive subsurface traces (6 to 12 for example), one can readily find that it is almost impossible to separate them by means of conventional mono-component processing.

SUMMARY OF THE INVENTION

The seismic prospecting method according to the invention allows positioning of geologic events in space in the neighborhood of the well. It comprises reception, by multi-axis seismic sensors placed in a well and coupled with the formations surrounding the well, of the components along three axes of seismic waves reflected by the subsoil discontinuities in response to seismic waves emitted in the ground by a seismic source (at the surface, in the same well as the sensors or in a different well).

The method of the invention is characterized in that it comprises assignment, to the seismic data received, of data defining the orientation in space of the multi-axis reception sensors, parallel application to the three components of the waves received of processing operators allowing selection, from the waves received at each multi-axis sensor, of the polarized waves useful for characterization of the geologic structure in the neighborhood of the well (notably the reflected P or S waves and the arrival of diffracted or refracted P or S waves), location in space, at each multi-axis sensor, of the respective directions of origin of these polarized waves, and positioning in space of the seismic events that have generated said waves.

The method can comprise for example formation of a developed cylindrical image consisting of juxtaposed windows, each one of which contains the seismic traces received in a determined time slot, resulting from the azimuthal direction defined by the abscissa and from the direction of inclination to the vertical defined by the ordinate, allowing discrimination of the polarized waves by location of each seismic event in the P wave through identification of the position of the window where this event generates the strongest traces, and of each seismic event in the S wave, through identification of the position of the window where this event generates the least strong traces.

The method can comprise a step of joint inversion of the times and of the polarization of the reflected arrivals, notably by ray tracing, using the azimuth and the inclination of the direction of origin of the seismic events, so as to spatially locate, in three dimensions, the position of points of the environment that have reflected, diffracted or refracted waves, such as, for example:

the reflection point that has reflected the ray, as well as the dip and the azimuth, of the plane tangent to the reflecting surface at the reflection point, the scatterer acting as a secondary re-emission source, and the fault plane which generates a secondary refraction.

The method can also comprise an inversion limited to the determination of the dip and the azimuth of the reflecting interfaces situated in the immediate neighborhood of the well (local domain stack, often referred to as corridor stack by specialists), in the thickness of the zone surveyed by means of the VSP technique.

BRIEF DESCRIPTION OF THE DRAWINGS

Other features and advantages of the method according to the invention will be clear from reading the description hereafter, with reference to the accompanying drawings wherein:

FIG. 3 is a flowchart summarizing all the operations required to implement the method according to the invention, FIGS. 4, 5, 6 respectively show an example of a field of three-component reflected P waves obtained by isotropic extraction from vertical two-way time VSP records with a source in the immediate vicinity of the well, wherein a seismic event D appears.

DESCRIPTION OF THE METHOD

Figure 1:
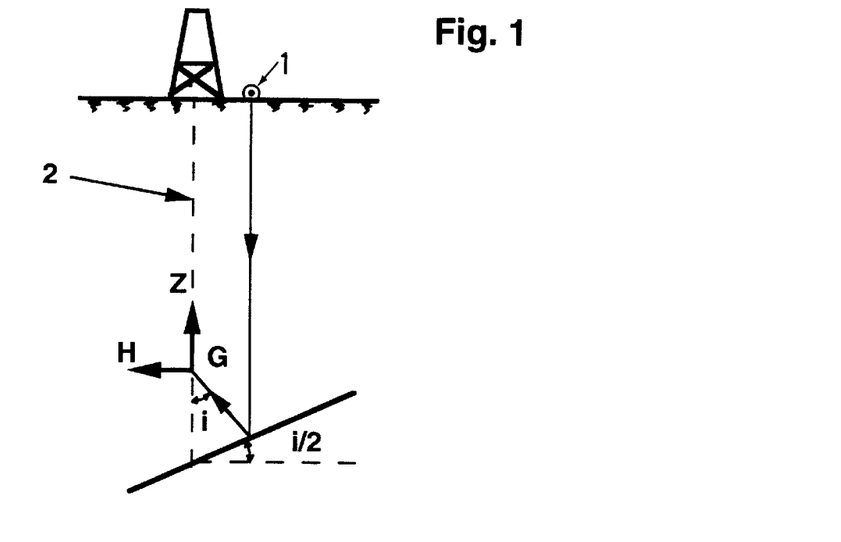
FIGS. 1, 2 illustrate the principle used for location in space of the position of seismic events reflecting P waves, by means of multi-axis seismic receivers.
Figure 2:
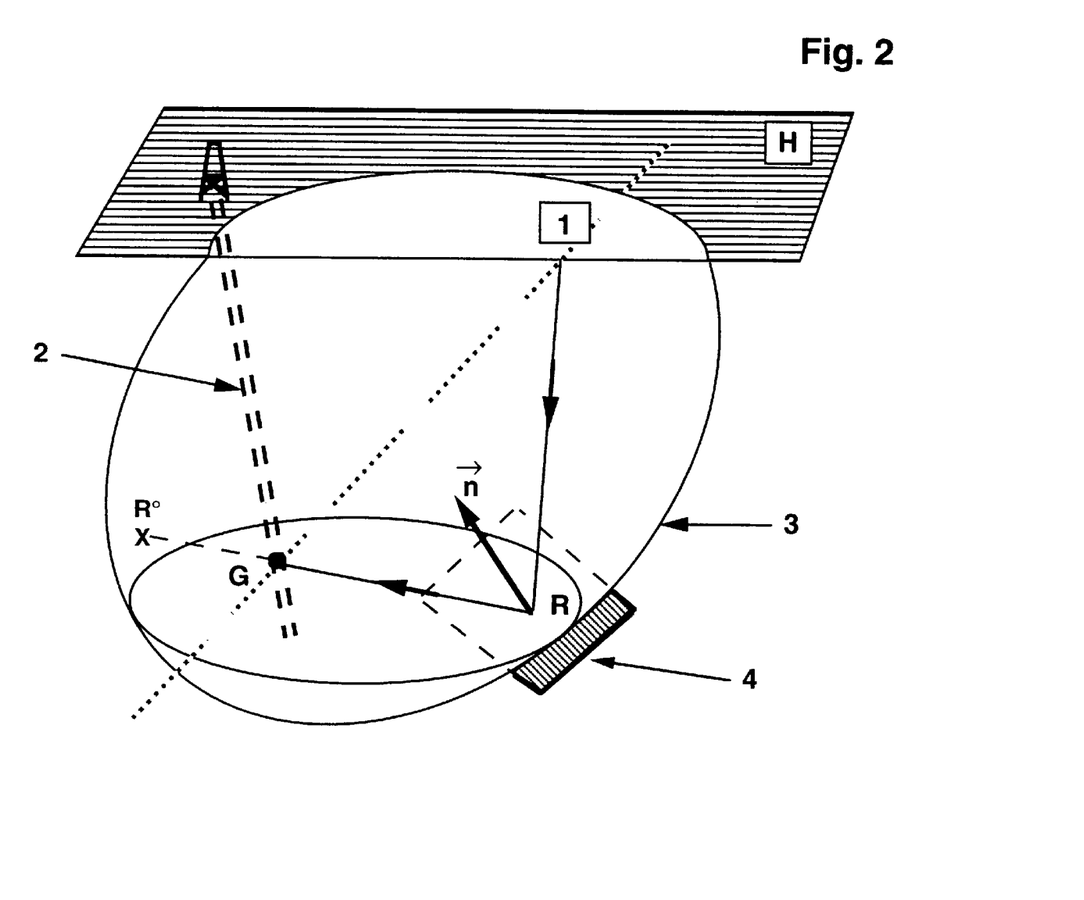

The method according to the invention is implemented by means of multi-axis sensors, such as triphones, coupled with the formations surrounding a well, and of a seismic source placed at the surface in the same well as the sensors, or possibly in another nearby well. The method applies the simple principle defined hereafter. In a simplified model with constant propagation velocity (FIG. 2), the locus of the points that have reflected waves emitted from an emission point 1 and picked up after reflection at another point G of a well 2, corresponding to the same propagation velocity vt is, as is well-known, an ellipse of revolution 3 with points 1 and G as the foci. It is also known that the direction of propagation of the P waves is colinear with the direction of movement of the particles in the propagation environment. Amplitude and phase combination of the three components (two components H and one component Z) received by a three-axis geophone situated at point G thus allows determination of the direction in space of the origin of the pressure waves and therefore the local orientation of a reflector which is a plane 4 tangent to ellipsoid 3 and of the normal n thereof. We can deduce therefrom the angle of dip i/2 of the reflector that has reflected these waves which, in the very simple case where the seismic source and the reflector are placed in the immediate neighborhood of a vertical well, is equal to half the angle i of inclination of the rays to the axis of the well, as shown in FIG. 1.

The above-mentioned principle will be applied hereafter to complex environments more representative of the subsoil structure, in order to constrain the possible structural patterns in the neighborhood of a well to a single solution. Among the waves received, those corresponding to the reflected pressure waves first must be isolated.

Figure 3:
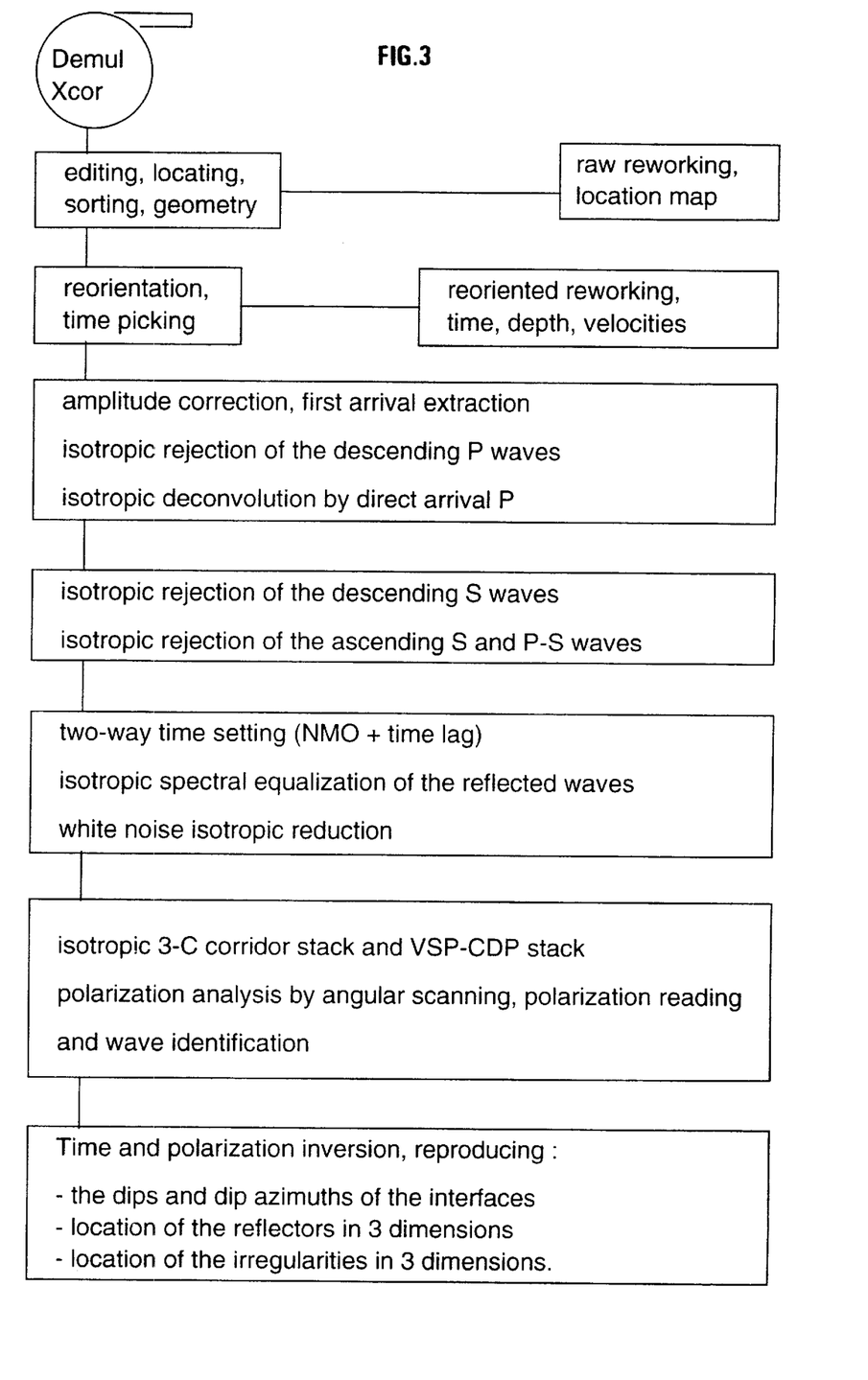

The method according to the invention comprises carrying out the successive processing stages described hereafter from raw seismic signals received by one or more three-axis seismic sensors or triphones coupled with the formations surrounding a well, either sensors placed in tools or sondes lowered in a well at the end of a cable or stationary sensors permanently installed as described in the inventor's patents mentioned above. All of the processing operations performed from the signals picked up are shown in the flowchart of FIG. 3.

1—Reorientation

The raw seismic data received by the sensors must be accompanied by data allowing spatial reorientation of the three components. Several cases may arise:

In a substantially vertical well, various means can be used to detect the orientation data to be associated with the seismic data picked up. These means can be magnetic orientation means locating the direction of the Earth's magnetic field in the case of an open hole, and/or inclinometers, or more rarely because of its high cost, a gyroscope. Orientation of the components is then perfectly measured in an open or a cased well.

In a deviated well, whose trajectory is known and generally measured separately by means of a tool equipped with a gyroscope, the three-axis sensors are mounted on Cardan transmission so that the orientation of the components is perfectly known.

In the case of a cased vertical well or of a deviated well of known trajectory with recording by fixed three-axis sensors in relation to the body of a tool, it is possible to use, under certain favourable conditions, the polarization properties of the direct seismic P waves in order to reorient the components situated in the plane perpendicular to the axis of the well. To that effect, direct arrivals must not be in a plane parallel to the axis of the well, and this reorientation is only valid for the logging in progress. This reorientation stage is well-known to the man skilled in the art and described for example by:

Becquey M et al. in Geophysics, 1990, Vol.55 No.10, pp. 1386–1388, and it can be implemented by means of reorientation softwares such as Géovecteur® of Compagnie Générale de Géophysique. The accuracy obtained is about ±5°, which is sufficient to expect the execution of the processings to be performed favourably.

2—Isotropic Extraction of the Useful Seismic Waves in Three Components

If it is desired to measure polarization parameters of the movement of particles in space from signals received by the three-axis sensors, it is necessary to store the phase and amplitude differences between the components during all the previous processing operations.

In particular, processing of the seismic signals obtained in VSP-3C requires the following conventional operations that are to be applied identically to the three components of the signals, preferably in the order shown by the flowchart in FIG. 3.

Multitrace filtering for separating events having different apparent velocities, either in an absolute reference set of geographic data or in a local geographic reference set relative to a subset of consecutive traces of a wave separation algorithm by designating under the term trace a three-component signal recorded at a given spatial point, dynamic equalization, deconvolutions whatever the type thereof, static corrections and dynamic corrections (moveout), monotrace or multitrace addition/subtraction, random noise reduction, etc.

Figure 4:
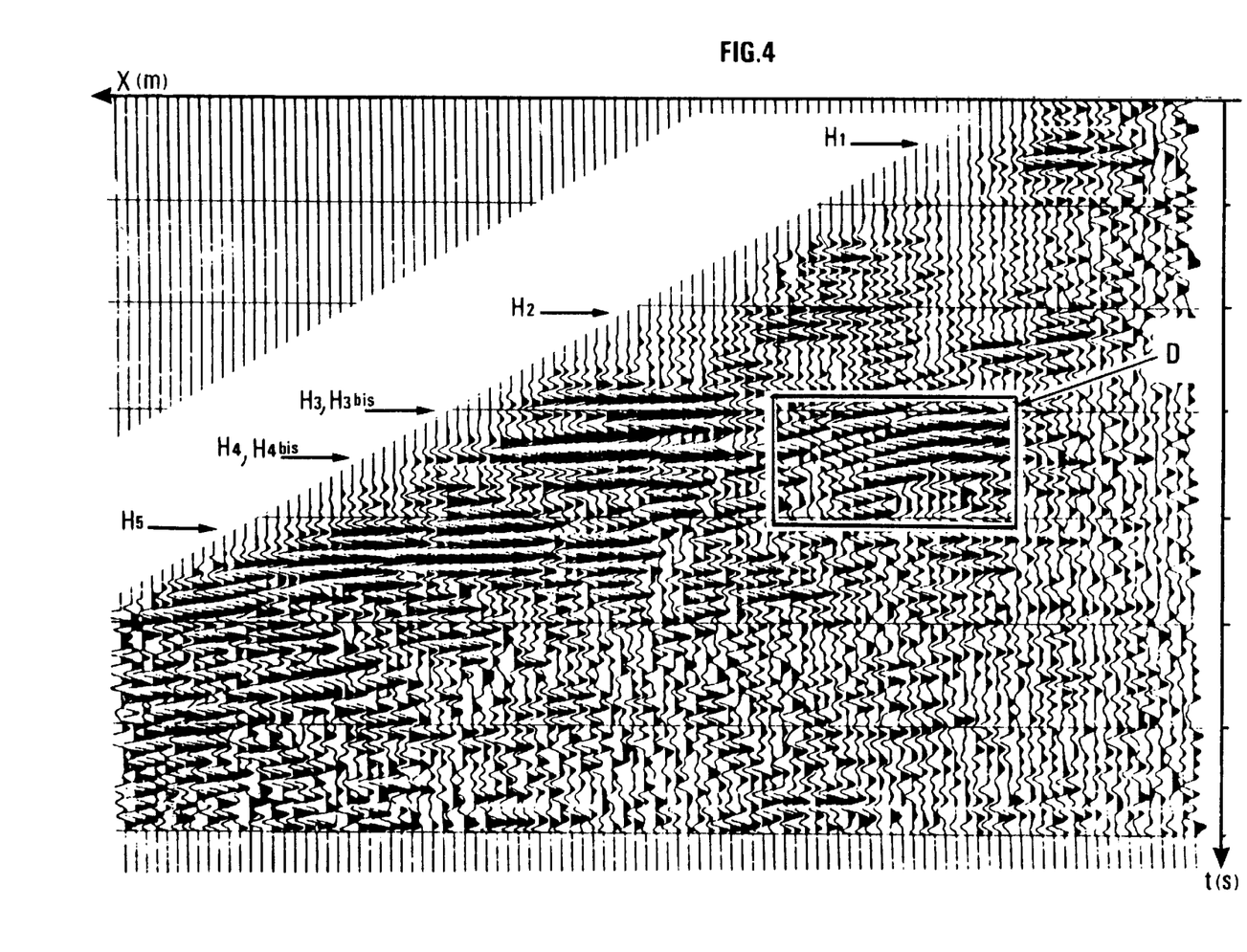
Figure 5:
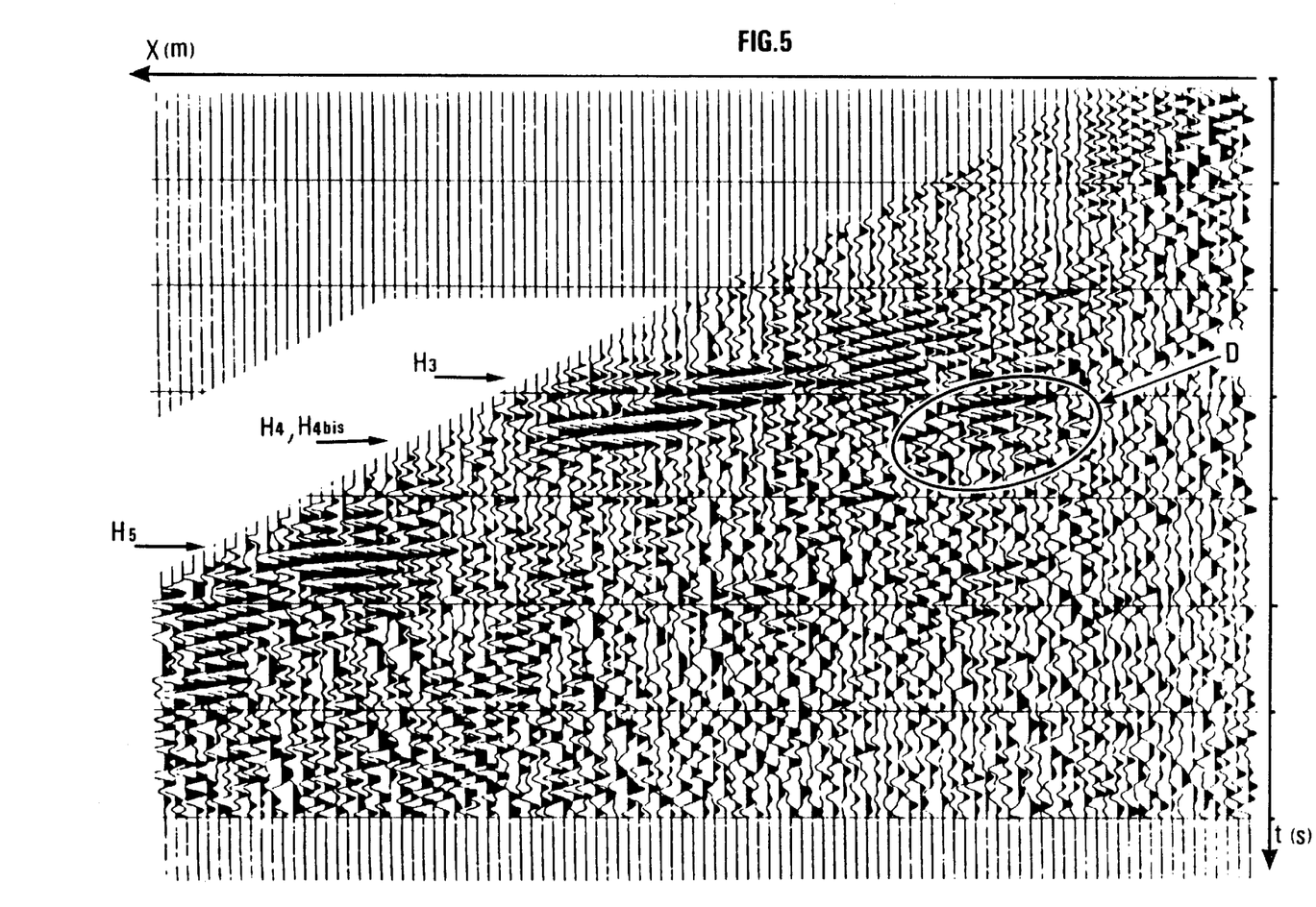
Figure 6:
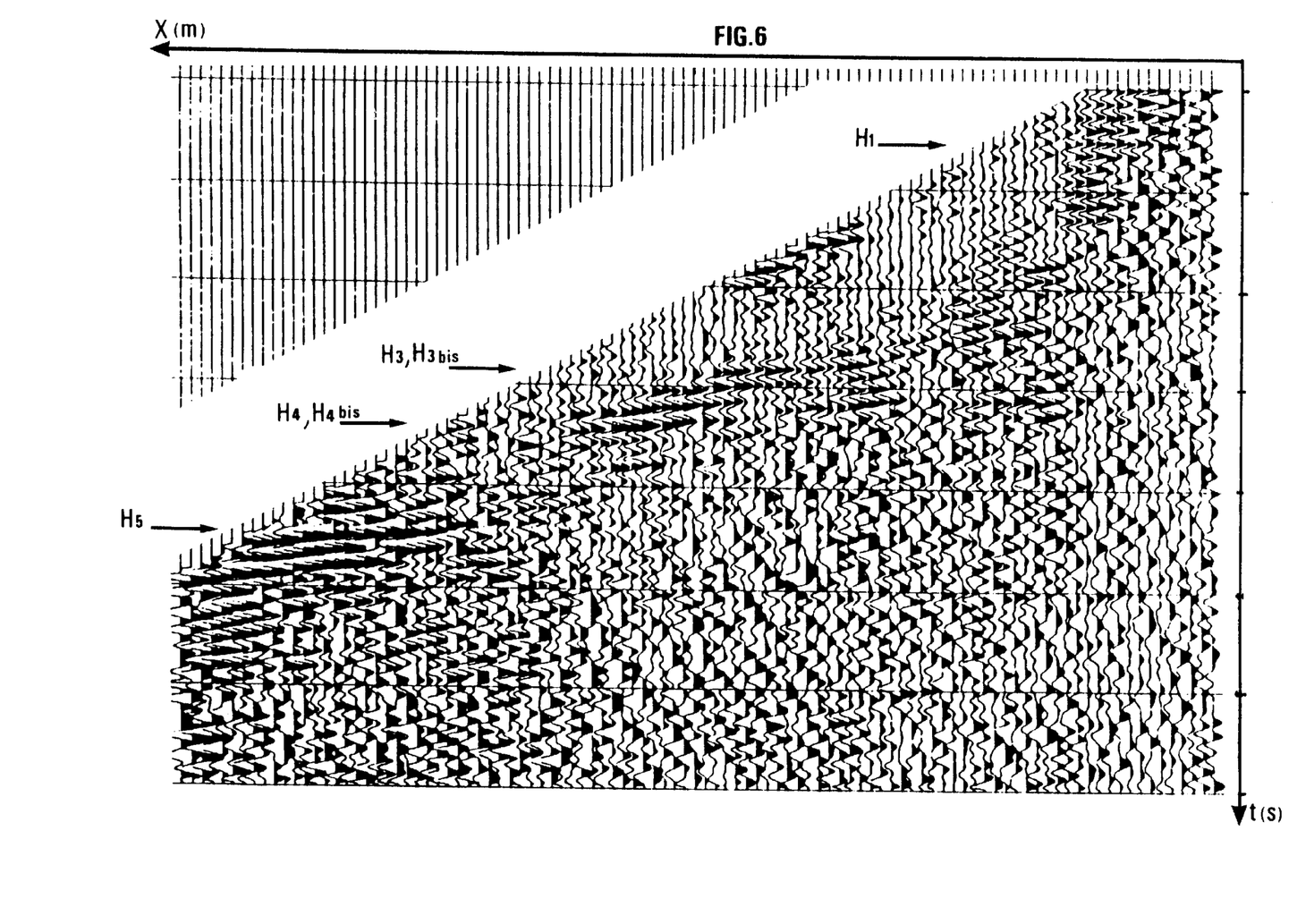

The term processing isotropy is used here to indicate that the same monotrace or multitrace mathematical operator is applied at the same time to the three components of each trace, and the operator may vary according to the seismic arrival time. Any signal processing algorithm exhibiting this feature can be termed isotropic and can be advantageously applied for processing well data with three components, in particular to eliminate unwanted arrivals so as to isolate the seismic arrivals sought. An example of the result of this isotropic extraction operation is shown in FIGS. 4–6 showing mainly the three-component reflected wave field in vertical two-way time.

3—Analysis of the Polarizations of the Arrivals Sought After Isotropic Extraction Generally, the arrivals sought are mainly the reflections in pressure waves (P wave) and the diffractions in P wave of linear polarization parallel to the direction of propagation or the diffractions in S waves of linear or ellliptical polarization in the plane substantially orthogonal to the direction of propagation.

If only one wave type is present at a given depth and time of arrival, and in an allowable range of apparent velocities, in the field of reflected P waves with three components, the polarization thereof can be directly measured (linearity or flatness, polarization orientation) on a single trace with three components and at a given time. The apparent velocities and the polarization type allow to identification of the wave type (P or S) to be dealt with and to deduce therefrom the direction of propagation.

On the other hand, if several wave arrivals of the same type or of different types appear on the same sensors nearly at the same time and with very close apparent velocities, and thus different provenances, it is more difficult to separate them. An analysis and direct reading procedure by angular scanning described hereafter is therefore used to identify and to separate the three-component wave field into discrete unitary events.

Figure 7:
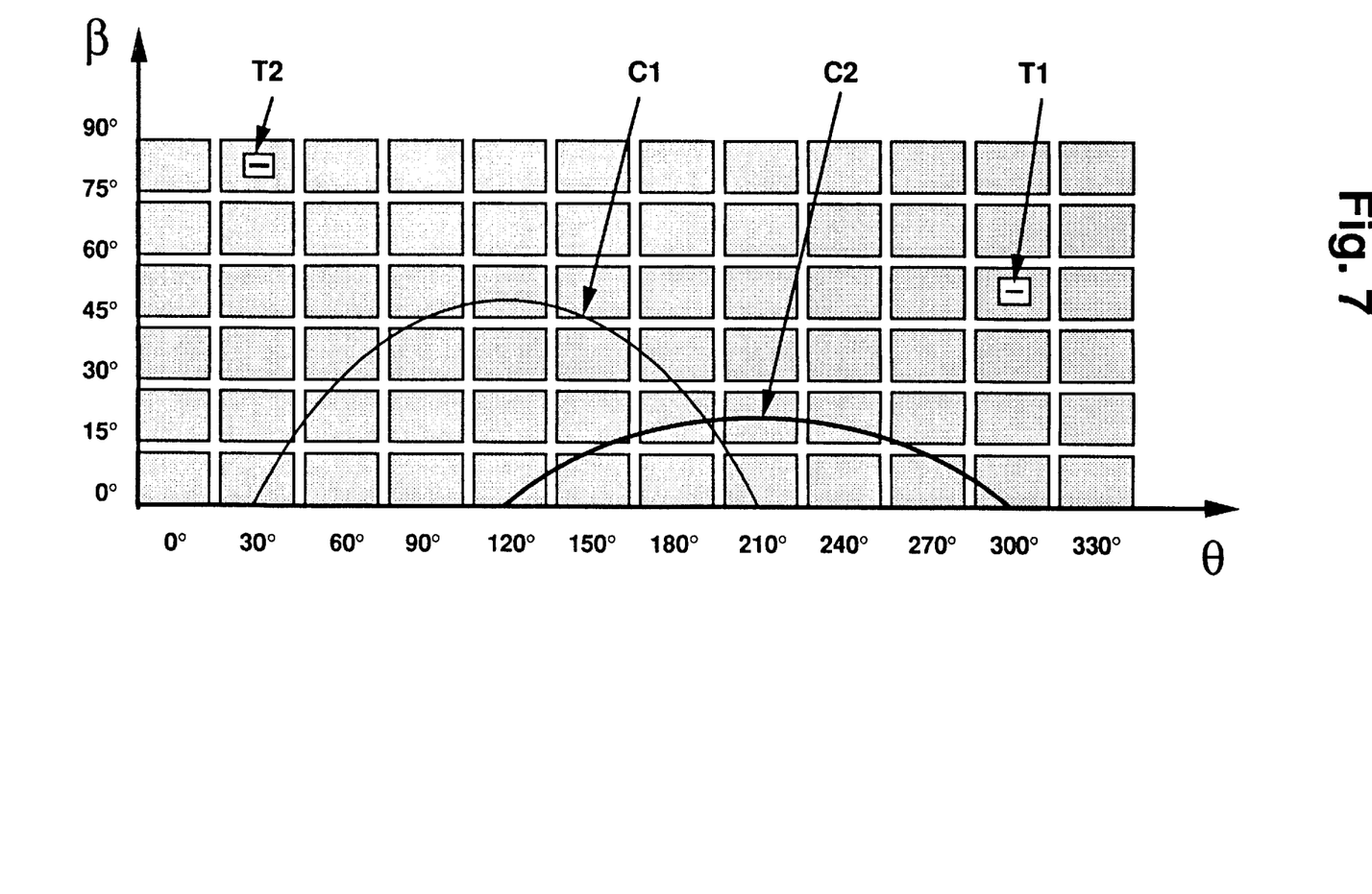
FIG. 7 shows a schematic example of a developed cylindrical projection allowing identification of the waves by the polarization thereof and location of the azimuth and of the inclination to the vertical, of the direction of origin of the seismic events of linear polarization where seismic events exhibit a maximum.

As shown in FIG. 7, a two-dimensional multiwindow table is formed which represents a developed cylindrical projection having, on the abscissa, the azimuth θ between 0° and 360° and, on the ordinate, the angle of incidence β of the arrivals between 0° and 90° with respect to the vertical. Each window represents the seismic traces received in a given time slot, coming from the direction shown by the abscissa and the ordinate which correspond to the position thereof in the table. In a cylindrical projection of a semi-sphere, the intersection circle with a plane passing through the centre appears as a substantially sinusoidal curve centered on the equator. Lines C1 and C2, which respectively join the points of the various windows where two linearly polarized seismic events, respectively E1 and E2, cannot be located any more, appear in this form in FIG. 7. The azimuths of windows T1, T2 respectively, where these events exhibit an observable maximum, are at 90° respectively from the foot of the two curves C1, C2. Such a graphical representation is convenient for discriminating more readily interfered arrivals and for identifying directly the wave types observed and their number.

It can be completed by automatic processing programmes allowing isolation of the various seismic events detected.

4—Time Inversion and Polarization of the Reflected Arrivals Observed

Figure 8A:
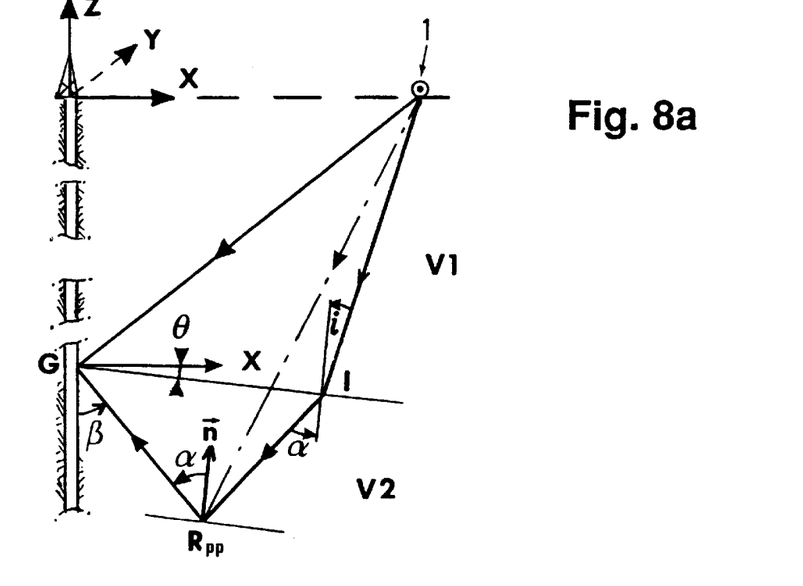
FIGS. 8a, 8b illustrate, on a simple model, the principle of inversion by ray tracing respectively in space and in an incidence plane of the reflected ray, FIGS. 9, 10, 11 respectively show the projection in two vertical planes and one horizontal plane of the locations of seismic events located on the records of FIGS. 4 to 6, which can be located by implementing the method according to the invention.
Figure 8B:
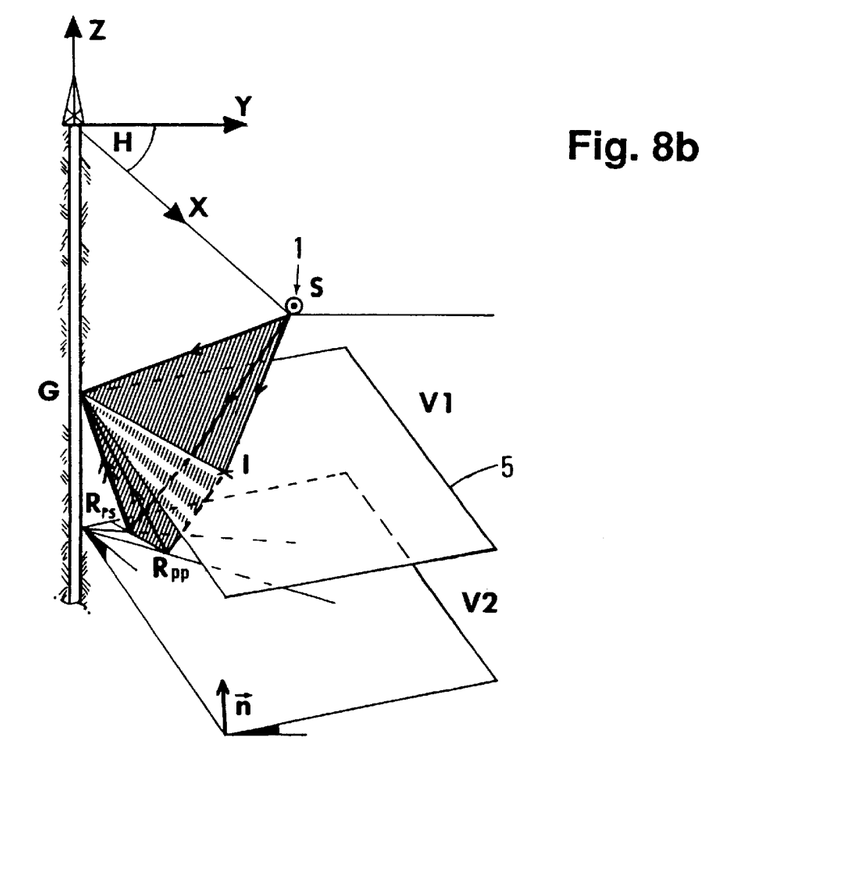
Figure 9:
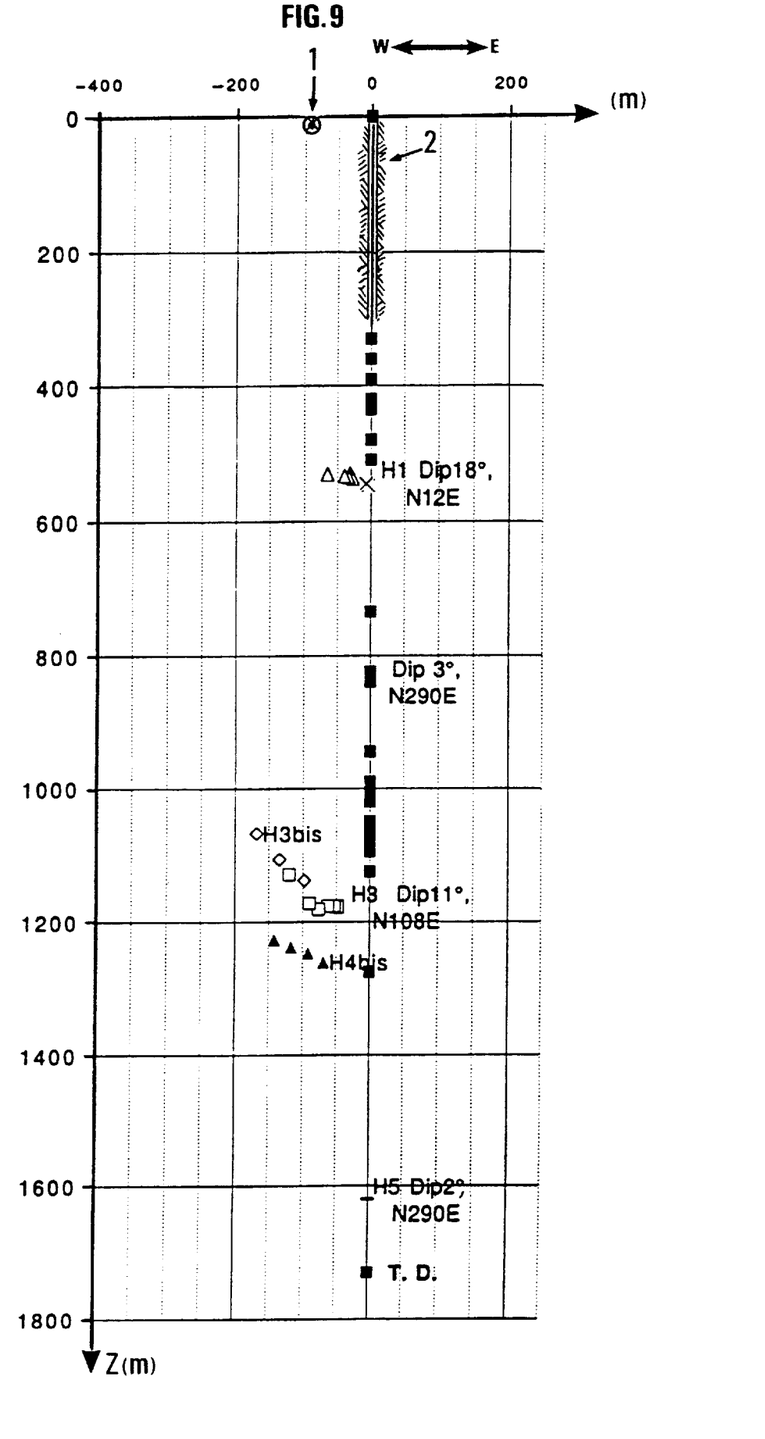
Figure 10:
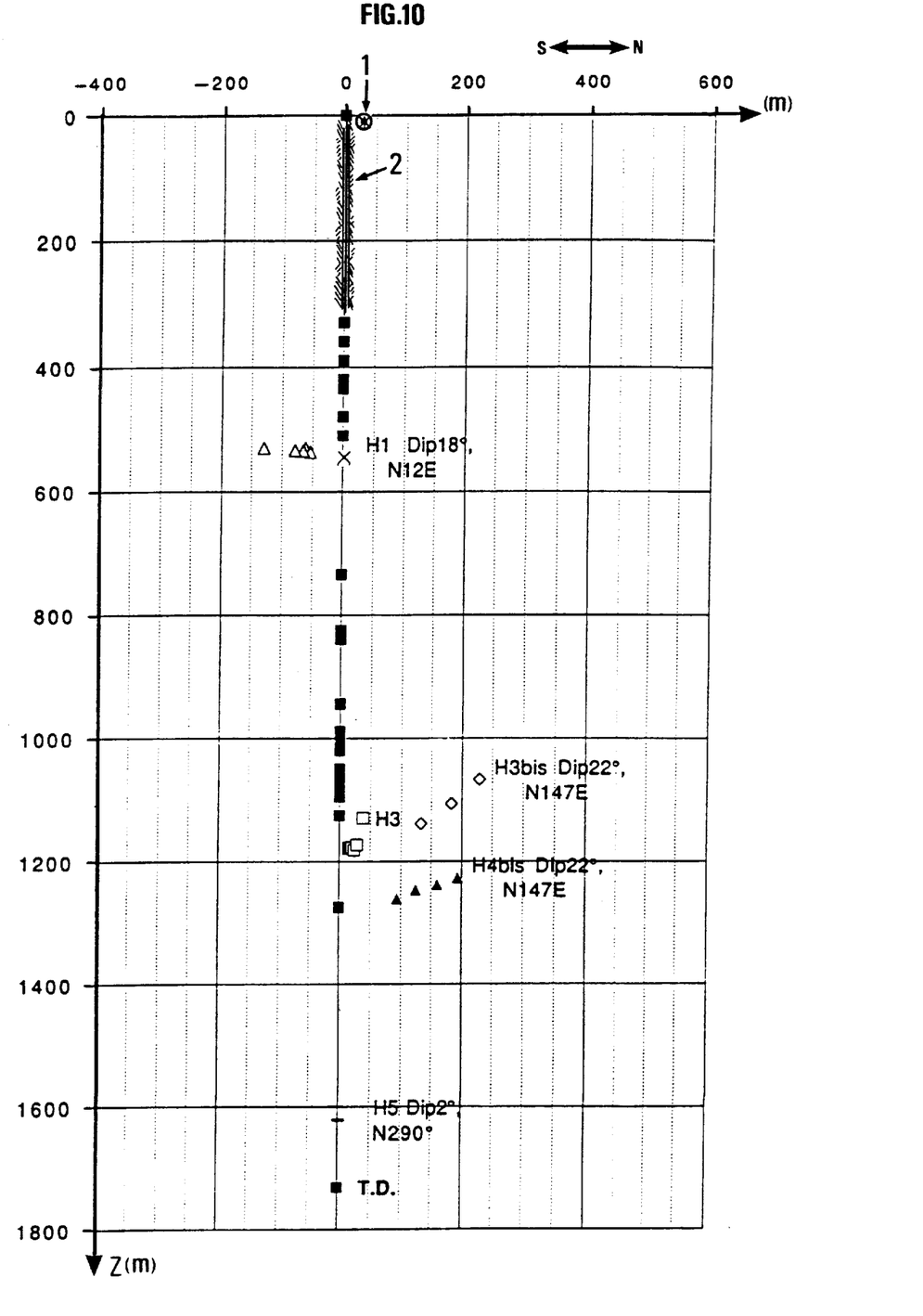

In the fourth place, the method comprises an inversion procedure using for example a conventional ray tracing programme in a velocity model with or without layer anisotropy, which must meet the velocities measured in well W and the dips observed on the reflectors placed between the surface source and the three-axis sensors G in the well. Tracing of the reflected part of the ray can be performed by emergence from the sensors in an uncertainty cone around the measured spatial direction of polarization of the reflected ray. An example of propagation in a simplified formation model with two velocities of propagation V1, V2 is shown in FIGS. 8a (spatial representation) and 8b (projection in the plane of propagation of the reflected ray). By means of ray tracing, in such a model, the position of the reflection point Rpp of co-ordinates (xr, yr, zr) where the pressure waves received at point G come from with the angle of inclination β and the angle of azimuth θ and the normal vector n at Rpp at reflector 5 are determined. The various reflection points of the pressure waves received, located by this inversion, can be represented in space. For greater convenience, they can be represented by their projections in various planes. FIGS. 9, 10 correspond to projections of the reflection points in two vertical planes oriented respectively West-East (W,E) and North-South (N,S), whereas FIG. 11 corresponds to their projection in a horizontal plane.

Figure 11:
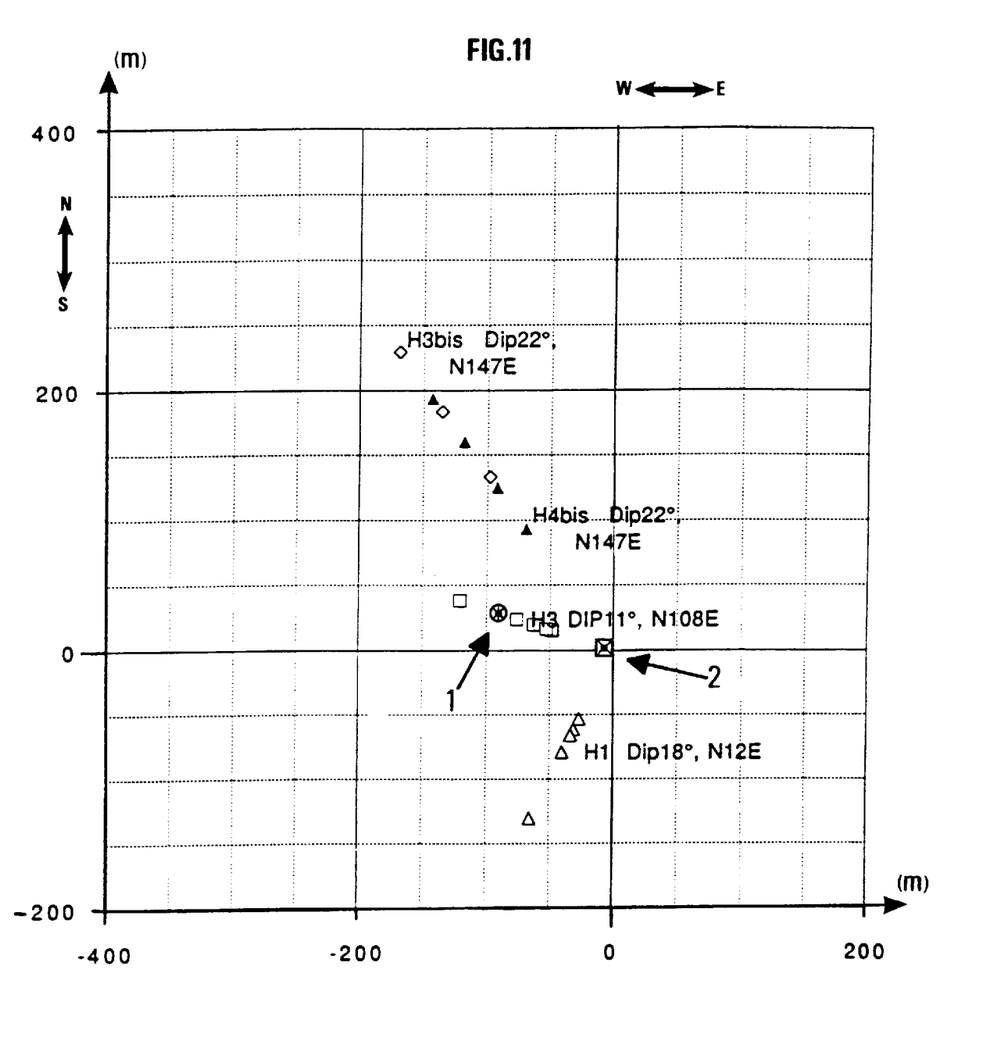

It is clear for example that events H3 and H3a, as well as H4 and H4a, which appear interfered in FIGS. 4, 5, 6, are distinctly represented by means of the method proposed as two illuminations of the same horizon in FIGS. 9, 10, 11, which would be impossible with a mono-component processing according to the prior methods.

The method thus leads to a single solution from VSP data alone, regardless of any other data, which provide very useful data for geologists, who are the end users of the results.

Figure 12:
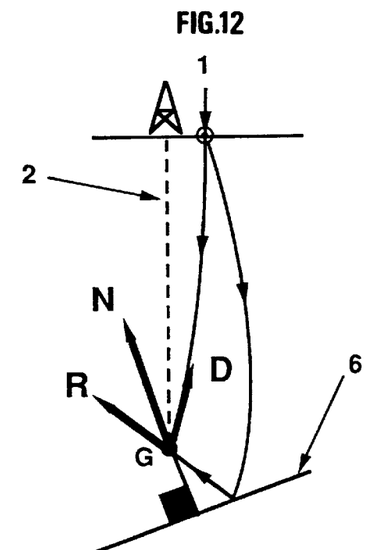
FIG. 12 illustrates the simplified case of the inversion procedure which can be applied in the immediate neighborhood of a well.

The inversion procedure described above can be considerably simplified in the zone surrounding the well where trace stackings are performed along a corridor centred on the first arrivals, a technique referred to as "Corridor Stack" by specialists. It can be considered in this case that the normal N to a reflector 6 (FIG. 12) is the bisectrix between the direction of propagation of the direct ray D and the direction of propagation R of the reflected ray, for the reflection domain in the immediate neighbourhood of the well (Descartes' law).

Inversion of High-Energy Major Diffractions and Refracted Waves

When diffraction or refraction type high-energy anomalies are observed, such as for example the hyperbolic arrival D (FIGS. 4, 5), the type of wave received by the sensors (P wave or S wave) first has to be identified in order to assign to these singularities a velocity of propagation in the neighbourhood of the sensor (velocity P or velocity S, these velocities being measured by means of the corresponding direct arrivals). An anomaly is generally linked with the presence of a geologic irregularity in the neighbourhood of the well such as a high-velocity fault or heterogeneity. A well-informed geophysicist knows how to identify types of anomaly and the seismic paths associated therewith.

This identification being done, an inversion combining the times of arrival of these anomalies and the polarization thereof allows one to know the depth or the depth extension of the irregularity that has generated them, as well as the distance between the latter and the well in the azimuthal direction of the geologic irregularity.

Figure 13A:
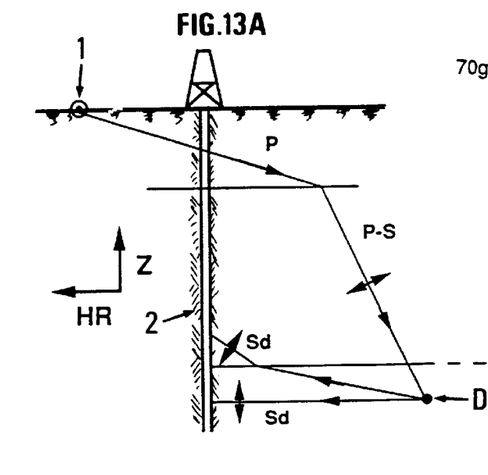
FIGS. 13a, 13b show the vertical and horizontal projections of the direction of propagation of an incident P-S wave converted into an S wave by a scatterer, corresponding to the event D of FIGS. 4 to 6, after inversion of the arrival times and of the polarization of the diffracted arrival.
Figure 13B:
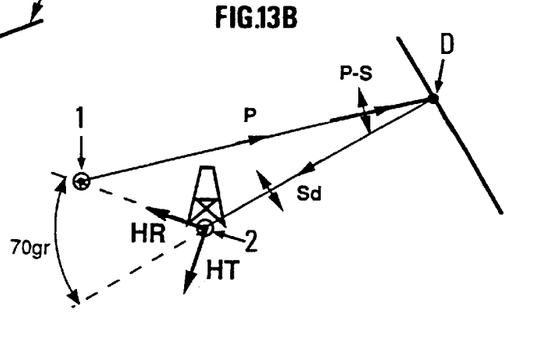

The result of this operation is for example that the anomaly D which can be observed in FIGS. 4, 5 is structurally reproduced in the diagrams of FIGS. 13a, 13b in vertical projection (FIG. 13a) and horizontal projection (FIG. 13b). In view of the results, a geophysicist can explain to a geologist that the ascending branch of the diffracted wave Sd, for example, has reverse polarities on components Z and HR (horizontal) and therefore that the diffracting event D is situated in the semi-plane beyond well 2 with respect to source 1.

5—Imagery

Figure 14:
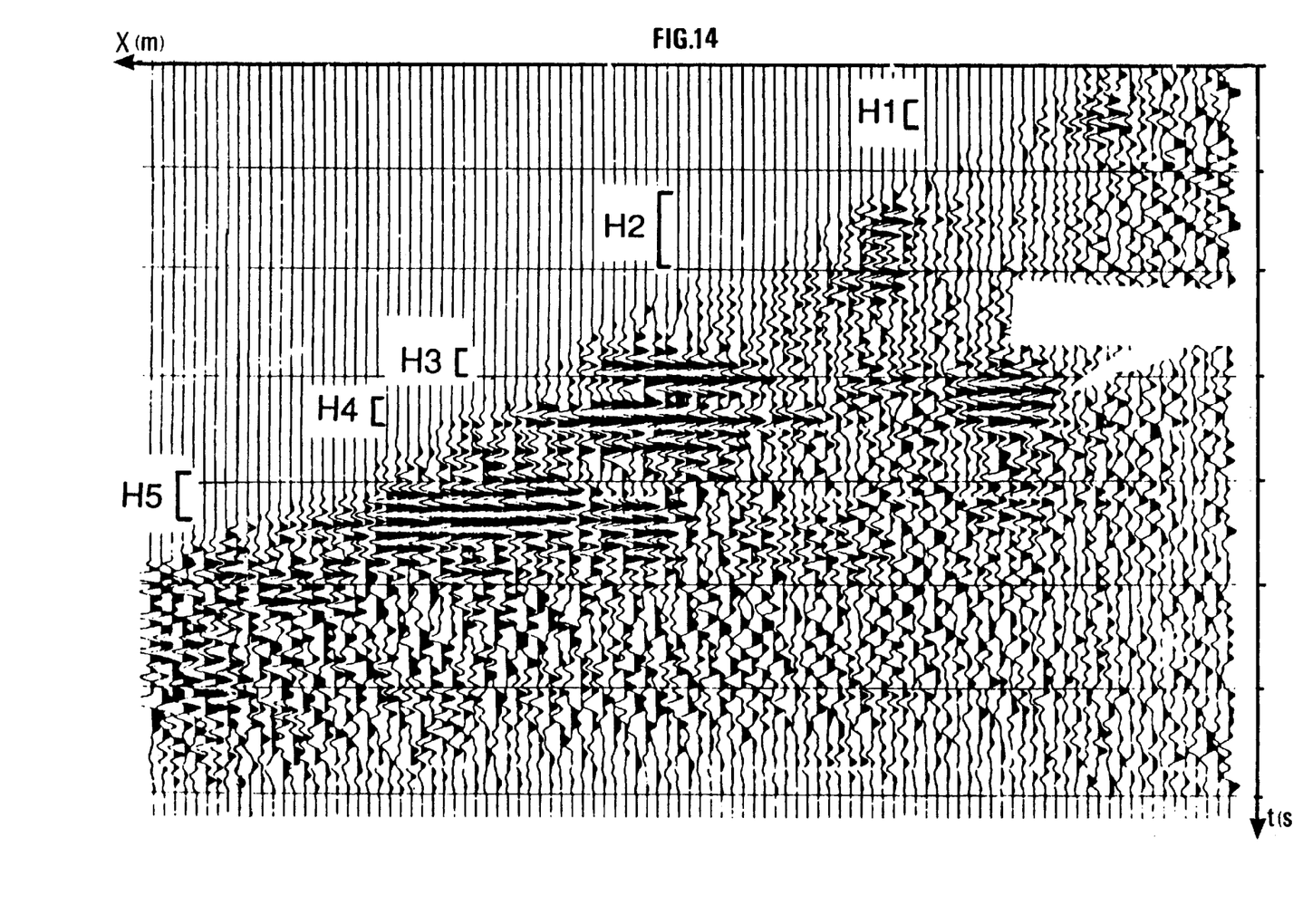
FIGS. 14, 15 represent the reflected wave fields separated after analysis by cylindrical projection which are used to produce common-depth-point images, a term that is understood to be, in the description hereafter, what specialists specifically refer to as "VSPCDP stack"
Figure 15:
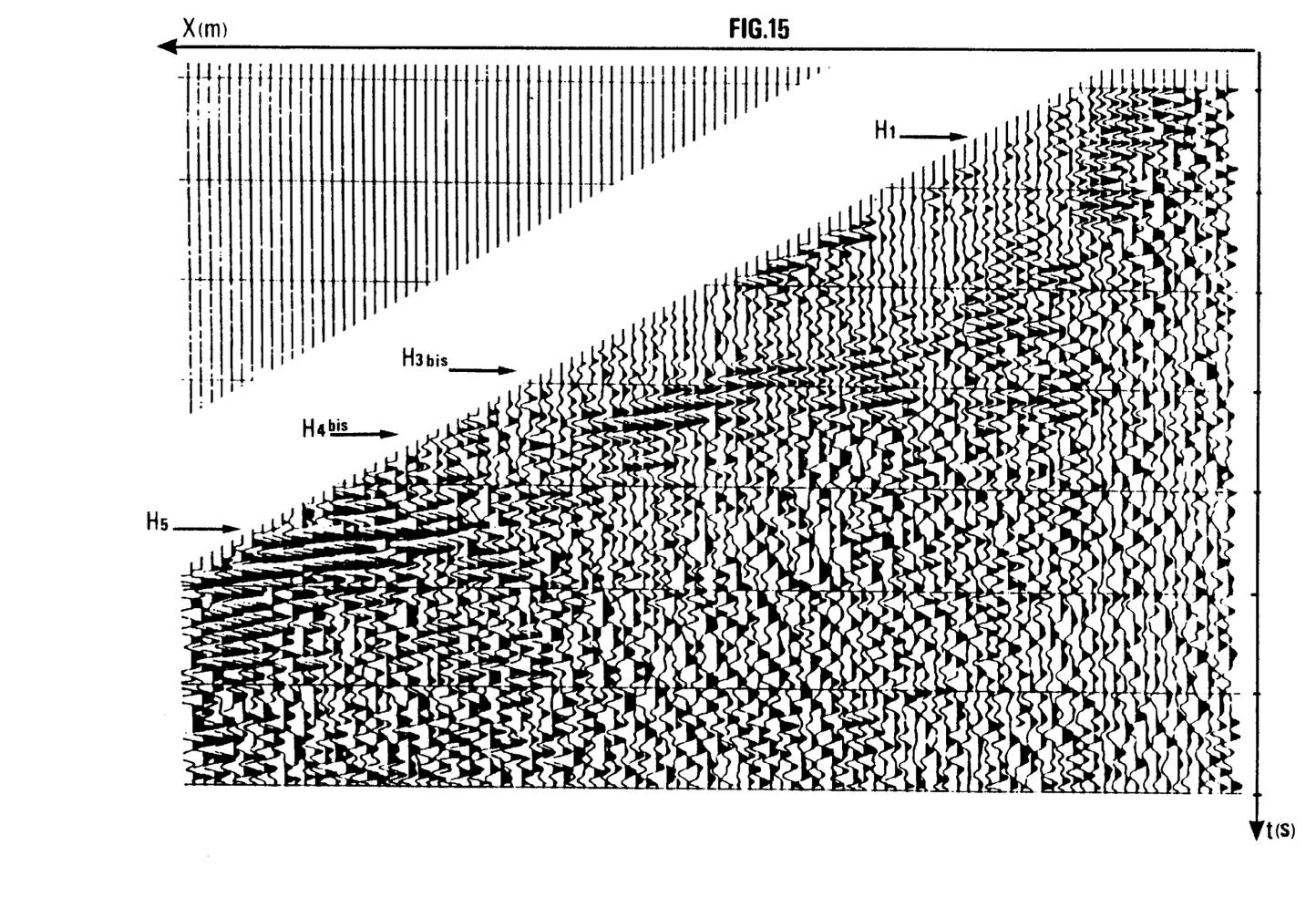
Figure 16:
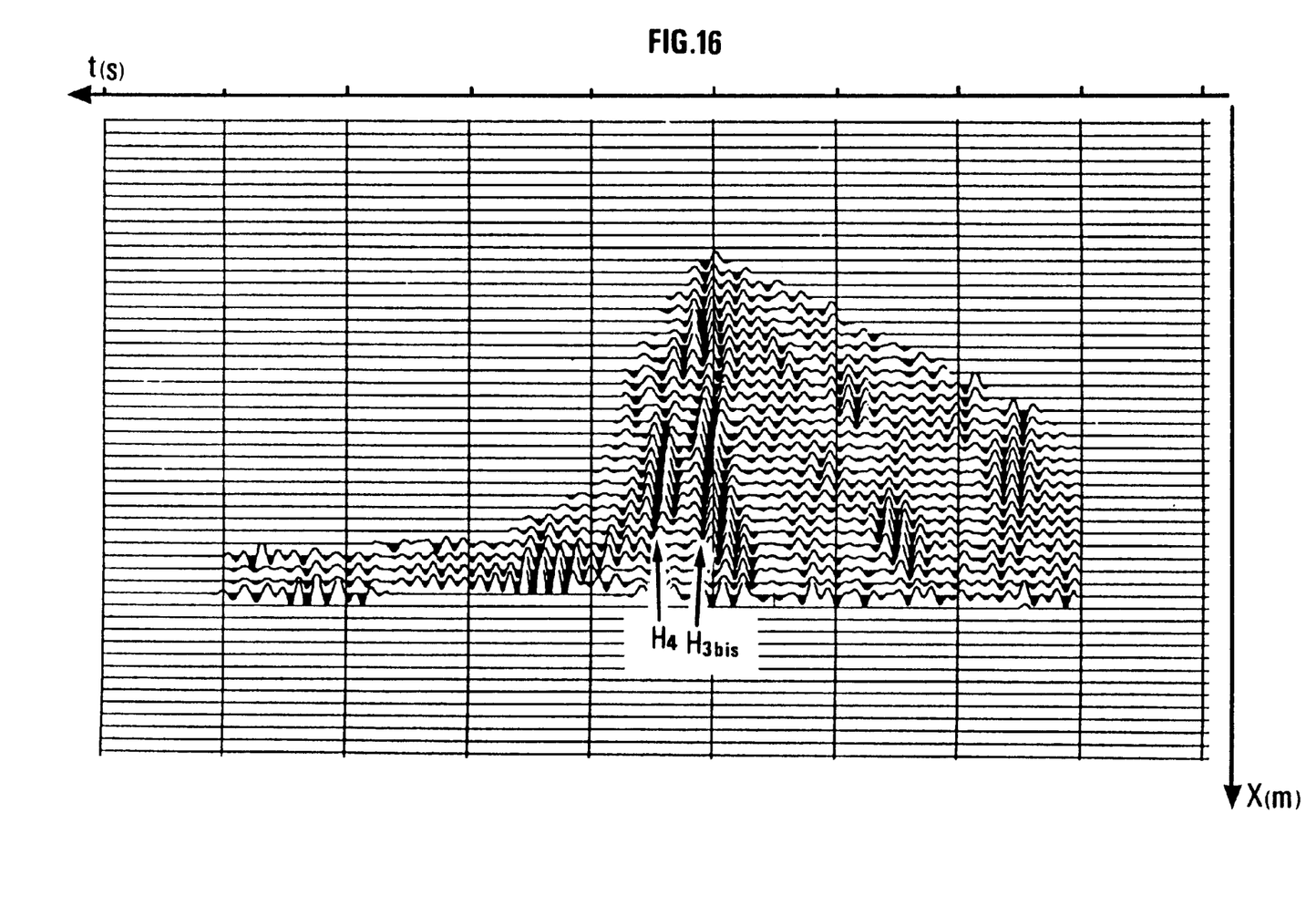
FIG. 16 shows the common-depth-point image of horizons H3, H4 with a dip of 12° in the azimuth N 108° E, at about 0.5 sec. in two-way time in FIG. 15.
Figure 17:
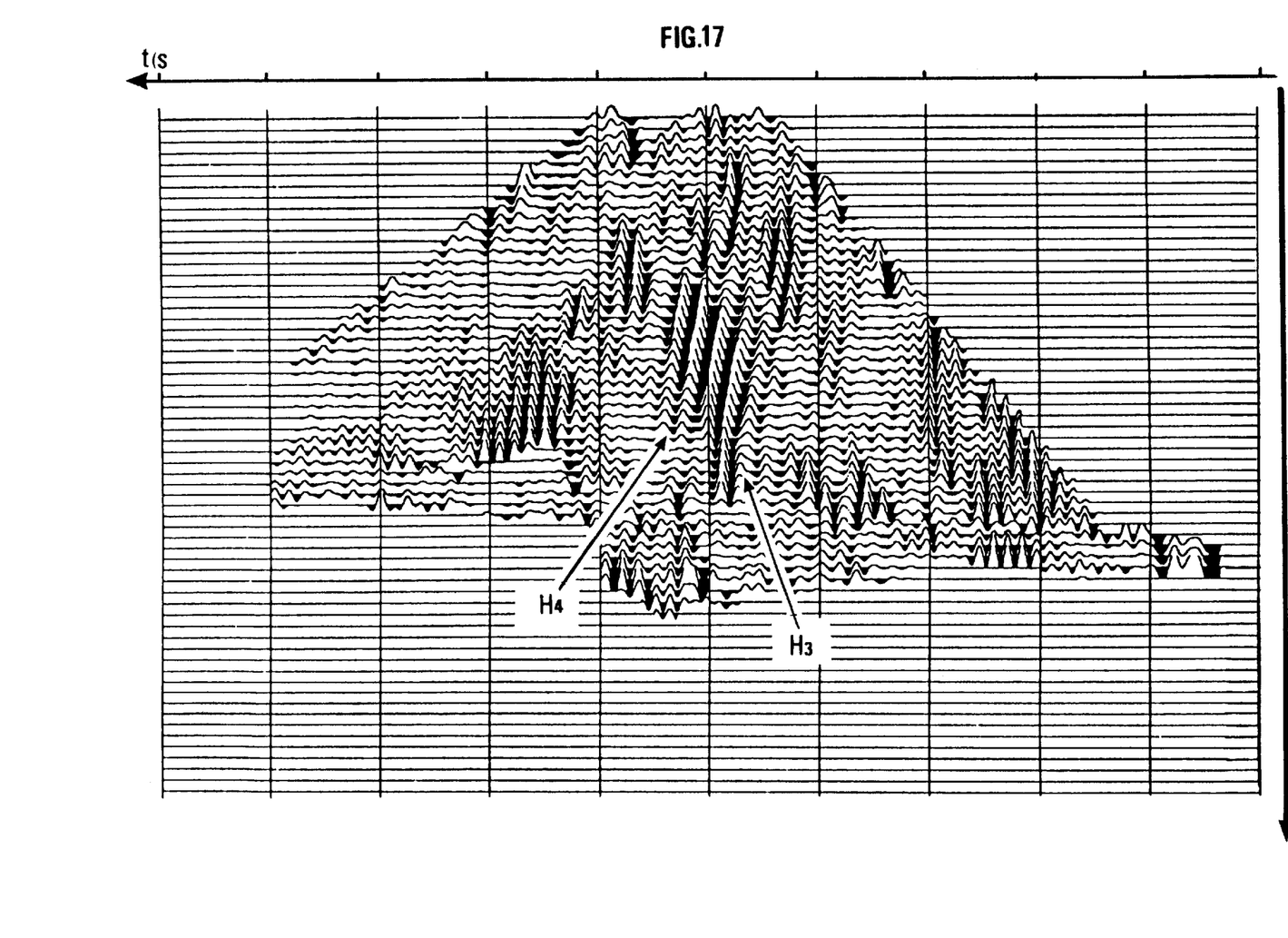
FIG. 17 shows the common-depth-point image of horizons H3a, H4a with a dip of 22° in the azimuth N 147° E situated at about 0.5 sec. in two-way time in FIG. 15.

The method can thereafter comprise a 3D point by point representation of the migrated reflected arrivals leading to a single geologic structural pattern solution. This pattern, with the associated velocities and dips, can be used as a model to produce a 2D multi-azimuth VSP common-depth-point seismic imaging (of VSPCDP stack type) or even a real 3D VSP common-depth-point image (VSPCDP-3D) by using well-known processing and imaging software. As we have seen above, FIGS. 14, 15 show the reflected wave fields separated after analysis by cylindrical projection which are used to produce common-depth-point images. FIGS. 16, 17 correspond to the two-way time images of the two families of reflectors H3, H4 and H3a, H4a detected and represented in FIGS. 9, 10, 11 above with respective dips of 11° (Dip 11°) and 22° (Dip 22°) in the respective azimuths N108° E and N147° E with respect to the well, which are visible at about 0.5 s in two-way time.

It is also possible to produce a 3D representation of scatterers corresponding generally to a 3D alignment of singular scatterers, for example a fault crest or an erosion cliff boundary and detected fault planes as a series of scatterers.

Fault planes or high-velocity geologic body borders (salt diapirs for example) can also be represented in 3D after inversion of the most obvious direct or secondary high-energy refracted arrivals.

For all these representations, there are many techniques known to the man skilled in the art permitting comprehension and readability of the images and of their geologic meaning for the final interpreting geologist.

I claim:

1. A method of seismic prospecting in a formation crossed by at least one well, said method comprising:

transmitting seismic waves into the formation, receiving, by at least one three-axis seismic sensor placed in the well and coupled with the formation surrounding the well, seismic data corresponding respectively to components along the three axes of seismic waves reflected by discontinuities in the formation in response to the transmitted seismic waves, assigning to the seismic data orientation data defining the orientation in space of the at least one three-axis seismic sensor, applying in parallel to the seismic data corresponding to the three components processing operators allowing selection, from polarized waves received at each three-axis sensor, of P or S seismic waves useful for characterization of the formation in a neighborhood of the well, locating in space, at each three-axis seismic sensor, respective origin directions of the polarized waves, and positioning in space each one of the seismic events having generated the polarized waves.

2. A method as claimed in claim 1, further comprising forming a developed cylindrical image consisting of juxtaposed windows, each of said windows containing seismic data received in a determined time slot, coming from a azimuthal direction defined by the abscissa and from a inclined direction defined by the ordinate, allowing discrimination of each one of the seismic events in the P wave by identification of a position of a window where each the seismic events generates the strongest traces and each seismic event in the S wave by identification of a position of the window where each of seismic events generates the least strong traces.

3. A method according to claim 1, wherein the waves useful for characterization of the formation are reflected and diffracted P or S waves.

4. A method according to claim 1, wherein the waves useful for characterization of the formation are refracted P or S waves.

5. A method as claimed in claim 1, further comprising inverting time and polarization of reflected waves to determine the spatial position in three-dimensions of points of the environment having reflected, diffracted or refracted the waves.

6. A method as claimed in claim 5, wherein the time and polarization of the reflected waves are inverted by ray tracing.

7. A method as claimed in claim 1 further comprising representing in space respective dips of the discontinuities in an immediate neighborhood of the well.

8. A method as claimed in claim 5, further comprising representing each of the seismic events by projecting the events in one or more planes.

9. A method as claimed in claim 7, further comprising representing in the form of dip logs seismic events situated in an immediate neighborhood of the well in the thickness of the formation.

10. A method as claimed in claim 1, wherein the seismic wave is transmitted by a seismic source placed at the formation surface.

11. A method as claimed in claim 1, wherein the seismic wave is transmitted by a seismic source placed in the same well as the at least one sensor.

12. A method as claimed in claim 1, wherein the seismic wave is transmitted by a seismic source placed in a neighboring well.

13. A method of seismic prospecting in a formation crossed by at least one well, said method comprising:

transmitting seismic waves into the formation, receiving, by at least one three-axis seismic sensor placed in the well and coupled with the formation surrounding the well, seismic data corresponding respectively to components along the three axes of seismic waves reflected by discontinuities in the formation in response to the transmitted seismic waves, utilizing an orientation detection device to provide data defining the orientation in space of the at least one three-axis seismic sensor, assigning the orientation data to the seismic data, applying in parallel to the seismic data corresponding to the three components processing operators allowing selection, from polarized waves received at each three-axis sensor, of P or S seismic waves useful for characterization of the formation in a neighborhood of the well, locating in space, at each three-axis seismic sensor, respective origin directions of the polarized waves, and positioning in space each one of the seismic events having generated the polarized waves.

* * * * *